(12) United States Patent
Westerdahl et al.

(10) Patent No.: US 10,386,520 B2
(45) Date of Patent: Aug. 20, 2019

(54) SEISMIC SENSOR RECORDING SYSTEM

(71) Applicant: STATOIL PETROLEUM AS, Stavanger (NO)

(72) Inventors: Harald Westerdahl, Dal (NO); Peter Hanssen, Fana (NO); Per Magnus Sparrevik, Oslo (NO); Stephen Walter Hayes, Nesoddtangen (NO); Klaus Tronstad, Oslo (NO)

(73) Assignee: STATOIL PETROLEUM AS, Stavanger (NO)

( * ) Notice: Subject to any disclaimer, the term of this patent is extended or adjusted under 35 U.S.C. 154(b) by 208 days.

(21) Appl. No.: 15/309,007

(22) PCT Filed: May 7, 2014

(86) PCT No.: PCT/EP2014/059391
§ 371 (c)(1),
(2) Date: Nov. 4, 2016

(87) PCT Pub. No.: WO2015/169357
PCT Pub. Date: Nov. 12, 2015

(65) Prior Publication Data
US 2017/0075014 A1    Mar. 16, 2017

(51) Int. Cl.
*G01V 1/38* (2006.01)

(52) U.S. Cl.
CPC .... *G01V 1/3852* (2013.01); *G01V 2210/1427* (2013.01)

(58) Field of Classification Search
CPC . G01V 3/15; G01V 1/3852; G01V 2210/1427
See application file for complete search history.

(56) References Cited

U.S. PATENT DOCUMENTS

| | | |
|---|---|---|
| 4,924,449 A | 5/1990 | Guigné |
| 5,022,012 A | 6/1991 | Godfrey et al. |
| 5,894,450 A | 4/1999 | Schmidt et al. |
| 6,842,006 B2 | 1/2005 | Conti et al. |
| 2004/0000912 A1 | 1/2004 | Conti et al. |
| 2006/0256652 A1 | 11/2006 | Thomas |
| 2009/0315539 A1 | 12/2009 | Helwig et al. |

(Continued)

FOREIGN PATENT DOCUMENTS

| | | |
|---|---|---|
| GB | 1 533 111 | 11/1978 |
| WO | WO 03/104844 A1 | 12/2003 |

(Continued)

OTHER PUBLICATIONS

Ikelle et al., "Introduction to Petroleum Seismology," Investigations in Geophysics Series No. 12, Society of Exploration Geophysicists, Tulsa, Oklahoma, USA, Published 2005, pp. 12-15, pp. 255-289, pp. 304-311 and pp. 395-417 (38 pages total).

(Continued)

*Primary Examiner* — Hovhannes Baghdasaryan
(74) *Attorney, Agent, or Firm* — Birch, Stewart, Kolasch & Birch, LLP (57) ABSTRACT

A sensor system for deployment on or close to the seabed in marine seismic surveys includes a central hub, and a plurality of arms coupled to the central hub. Each arm has a degree of freedom of movement with respect to the central hub. The system further includes at least one seismic sensor mounted to each of said arms.

13 Claims, 11 Drawing Sheets

(56) References Cited

U.S. PATENT DOCUMENTS

2012/0067268 A1     3/2012   Guerrero et al.
2013/0058192 A1     3/2013   Gateman et al.
2013/0081564 A1     4/2013   Brizard et al.

FOREIGN PATENT DOCUMENTS

WO    WO 2007/023304 A1    3/2007
WO    WO 2011/121128 A2    10/2011

OTHER PUBLICATIONS

Sheriff et al., "Exploration Seismology (Second Edition)," Cambridge University Press, Second edition published 1995 (First published 1982), pp. 258-260, pp. 452-453 and pp. 506-508 (11 pages total).

SEISMIC SENSOR RECORDING SYSTEM

TECHNICAL FIELD

The present invention relates to a seismic sensor recording system for use in conducting marine seismic surveys. The invention also relates to a method of using such a system.

BACKGROUND

In the context of marine seismic surveys, two types of seismic waves are of interest, namely P waves and S waves. P waves, or Primary waves, are compressional waves that are longitudinal in nature. These are pressure waves that can travel through any type of material including fluids. S waves, or Secondary waves, are shear waves that are transverse in nature and cannot travel any distance through fluids. They travel more slowly through solid materials than P waves, hence the name ("Secondary"). As S waves cannot travel through fluids, they can only truly be detected by receivers that are mechanically coupled to the seabed. Sophisticated processing techniques have been developed to make use of detected S and P waves to image subsea regions and in particular to detect and monitor hydrocarbon bearing formations.

Whilst, traditionally, P waves have been detected using arrays of sources and receivers towed in the water, both P and S waves can be monitored by measuring two physical effects at the seabed, namely pressure and particle velocity or particle acceleration. These measured physical effects may be analyzed using complex algorithms in order to detect and separate the P and S waves. Traditionally, seismic seabed surveys have been conducted using arrays of so-called 4c sensors, each of which monitors four components, namely pressure and three orthogonal components of particle velocity (x, y and z), or particle acceleration, using a single hydrophone and three orthogonally-oriented geophones. More recently, it has been appreciated that additional data—including pressure derivatives in the horizontal plane (x and y directions) and the particle velocity derivatives in the horizontal plane (x and y directions)—can prove valuable in monitoring the P and S waves, resulting in higher quality (e.g. higher resolution) data and added value in subsurface mapping. [The terms "gradients" and "derivatives" are used interchangeably in the technical literature.]

It is noted that the horizontal particle velocity (in the water column) can be, and in practise normally is, derived from the horizontal pressure gradient measured at the seabed. Furthermore, the horizontal particle velocity's horizontal gradient can be derived from the derivative of the pressure gradients, that is the second order horizontal pressure gradient, and so forth.

To obtain additional data to improve the quality or value of the P-wave field data, so-called 6c sensors are employed to measure six components, namely; pressure (p) and its first order spatial derivatives in the horizontal plane (dp/dx, dp/dy), and vertical particle velocity (Vz) and its spatial derivatives in the horizontal plane (dVz/dx,dVz/dy). In some cases, even more complex sensors may be used, e.g. 10c sensors to collect the 6c data plus four second order derivatives. These sensors do not necessarily need to be at the seabed, and could in principle be positioned anywhere in the water column. However, in order to measure S-waves, seabed coupled horizontal geophones or accelerometers are needed. These sensors are included as two of the components in traditional "4C seismic seabed recorders". Here the four components (4C) are: pressure, vertical particle velocity and the two orthogonal horizontal particle velocity sensors. When 6C and/or 10C sensors are combined or integrated with one or more seabed coupled 4C sensors, additional data is then available for improving the data quality of both S-wave and P-wave data.

Figure 1:
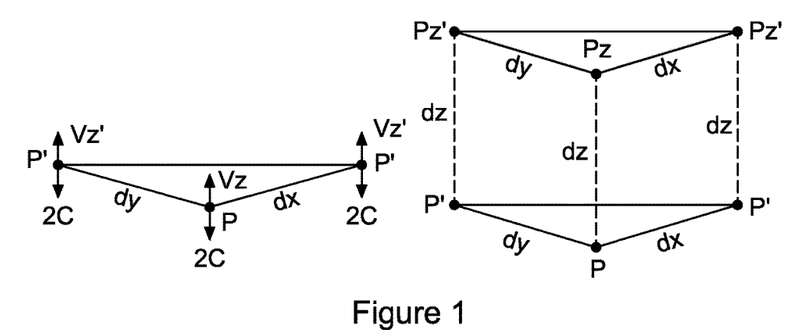
FIG. 1 illustrates schematically two alternative 6C sensor configurations.

FIG. 1 illustrates schematically two possible 6c sensor configurations. On the left is shown a configuration comprising 3×2c sensors, each comprising a hydrophone and a vertically oriented geophone. On the right is shown a configuration comprising 6×P sensors, each comprising a single hydrophone (nb. it is known that vertical particle velocity can be measured by making two separate vertically spaced pressure measurements).

A number of texts cover the principles of acquisition of marine seismic data (e.g., Sheriff and Geldart, 1995; Ikelle and Amundsen, 2005). There are several configurations of source and receiver distributions; those commonly used for petroleum exploration are (1) towed-streamer acquisition, where sources and receivers are distributed horizontally in the water column near the sea surface; (2) ocean-bottom seismic (OBS) acquisition, where the sources are towed in the water column and the receivers are on the seafloor; and occasionally (more rare) (3) vertical-cable (VC) acquisition, where the sources are towed near the sea surface as in towed-streamer and OBS acquisition but the receivers are distributed in the water in a vertical array.

A particular case of the OBS acquisition involves the use of Ocean Bottom Nodes (OBNs), rather than the ocean bottom cables. OBNs are typically battery powered, cable-less receivers typically deployed one by one in deep water, or attached to a wire or rope for deployment in shallower waters, whatever makes the operations most safe and efficient. OBNs are especially suited for use in relatively congested waters where the towing of streamers and/or deployment of ocean bottom cables is difficult. OBNs are typically deployed and recovered by Remote Operated Vessels (ROVs), using free fall systems and acoustic release to facilitate recovery, or using "nodes on rope" techniques where multiple nodes are attached to a rope with an acoustic release buoy at the end. These approaches are traditionally used to detect data that consists of both P and S waves. It should also be noted that there are significant advantages to collecting data (P waves) at or close to the seabed where recording conditions are quiet, being shielded from sea currents, and where conditions are good for low frequency data recorded by particle velocity sensors or accelerometers.

WO2011/121128 describes a method of providing seismic data (such as marine seismic data). A seismic source is actuated at a plurality of source locations. For each source location, a multicomponent seismic measurement is performed at at least one receiver location. A reconstructing method is applied to each multicomponent measurement to obtain additional data corresponding to source locations additional to the source locations at which the source was actuated. The additional data are output and/or used. WO2011/121128 proposes, by way of example, that this approach may be used in the context of OBN/OBS acquisition, i.e. where multicomponent (6c) receiver nodes are located on the seabed and the sources are towed in the water column by a surveying vessel.

Commercial Oil and gas discoveries are typically found in sedimentary structures defined as "traps", where porous rocks are covered by tight cap rocks. The structures are visible on seismic images due to variations in elastic properties of the rocks. P and S wave derived images may have different expressions, because their response is determined by different elastic properties (shear stiffness and normal stiffness) and may produce images that can be both supplementary and/or complementary. For example, S waves may more easily "see through" overburden sediments containing gas, whereas P waves may be completely attenuated. Furthermore, S waves may be more responsive to fluid overpressure and associated Geohazards. On the other hand, P waves are more sensitive to fluid type (distinguish gas, oil, water) than are S waves. Using the combination of P and S wave responses, one can improve the overall geological and geophysical interpretation of the data, providing a more accurate estimate of location, size and volume (and pressure) prediction, and type of fluids presents in the reservoirs.

In order to produce high quality S and P images of the subsurface, advanced data processing of the recorded data is needed in order to filter out noise and "beam-form" or migrate the seismic energy to the right location (to the image point). Traditionally P and S data are imaged separately, and one assumes (requires) that the P-wave data set is free of S waves (also free of S to P converted data) and the S-wave data set is free of P waves. This may not be the case in practice, and therefore the results may be compromised.

Traditionally, the seismic industry relies upon processing/imaging steps to try to "wash out" and suppress any P wave/S wave crosstalk interference. Clearly, reducing the levels of noise in the input S and P wave data would improve the final image/or inversion results (for a given amount of effort/data size input and set of processing steps). Cleaner S and P input data, also would make processing/imaging/inversion using the wave equation more efficient, because a coupled solution (using full elastic formulation) may be split into separate processes, and run more efficiently with simpler formulations (for example scalar formulations).

A problem encountered with OBS systems is the interference that occurs between the two types of waves. For example, a detector mechanically coupled to the seabed and configured to detect S waves will pick up the effects of P waves propagating in the seabed. Although it may be possible to remove much of the effects of the early P waves by filtering based upon arrival time (P waves propagate faster through the subsea formation than do S waves) and apparent speed (or so called "moveout"), not all of the effects can be removed, due to mixing with later P arrivals, for example as a result of reflections from different interfaces, ringing in the source signal, and overlapping P and S energy in time due for example to P-S conversion and reflections at or close to the seabed. Conversely, a detector located in the water just above the subsea surface and configured to detect the effects of P waves may be influenced by S waves. Although S waves do not propagate through the water, there will be some conversion of S waves and surface waves/interface waves (Scholte wave; S-wave travelling along the seabed) to P waves at the seabed. It is desirable to remove the effects of such converted S waves from the data collected by the P wave detector and remove the effects of P-waves on the S-detector.

U.S. Pat. No. 5,894,450 describes an oceanographic sampling system employing an array of underwater vehicles. U.S. Pat. No. 6,842,006 describes a sea-floor electromagnetic measurement device for obtaining underwater measurements. US2012/0067268 describes a subsea vertical glider robot for use in oceanographic research. US2006/0256652 describes a method of acquiring seismic data and which involves deploying an array of seismic receivers dropped onto the seabed. US2013/0058192 describes an ocean bottom seismic cable recording apparatus. US2013/0081564 describes a deployment and recovery vessel for an autonomous underwater vehicle for marine seismic surveys.

SUMMARY

According to a first aspect of the present invention there is provided a sensor system for deployment on or close to the seabed in marine seismic surveys. The system comprises a central hub, and a plurality of arms coupled to the central hub, wherein each arm has a degree of freedom of movement with respect to the central hub. The system further comprises at least one seismic sensor mounted to each of said arms.

The sensor system may be, for example, and Ocean Bottom Node or an otherwise seabed anchored node.

Considering further the sensor system, each arm may coupled to the central hub so as to allow the arm to pivot relative to the central hub. The arms may be pivotal between a near vertical pre-deployment position to a near horizontal deployed position, the sensor system comprising an arm release mechanism for facilitating movement of the arms from the pre-deployment position to the deployed position when the central hub is located on or close to the seabed. Alternatively, the arms may be freely pivotable over an angular range sufficient to allow all arms to settle onto the seabed when the central hub is located on or close to the seabed.

The sensor system may comprise a data recorder located within the central hub, the data recorder being coupled to each of the sensors in order to receive seismic data therefrom and, optionally, a clock located within the central hub to enable synchronization of data received from the sensors.

The sensor system may comprise a data recorder co-located with the or each seismic sensor and, optionally, a clock co-located with the or each seismic sensor. The sensor system may comprise at least one seismic sensor located within or in close proximity to said central hub.

Each seismic sensor mounted in each of said arms may be configured to be in mechanical contact with the seabed when the sensor system is deployed whilst substantially not being in mechanical contact with the arm or being secured to the arm by means of non-rigid coupling. The or each seismic sensor may be mounted at a peripheral end region of an arm.

According to a second aspect of the present invention there is provided a sensor system deployment on or close to the seabed in marine seismic surveys. The system comprises a central hub configured to sit on or close to the seabed, a mast projecting upwardly from the central hub, and a plurality of seismic sensors attached to the mast at at least two vertically spaced locations. The system may comprise a first set of seismic sensors attached to said mast at a first, lower level, and a second set of seismic sensors attached to said mast at a second, upper level.

Each said set of seismic sensors may comprise a set of pressure sensors spaced angularly around the mast, each being at a radial offset position with respect to the mast. The seismic sensor may be attached to the mast at one or both of the first and second levels, substantially at a radially central location, for example comprising at least one seismic sensor attached to said mast at a position between said upper and lower levels.

The sensor system may comprise a first set of accelerometers at said upper level and a second set of accelerometers at said lower level, each said set being located within a neutrally balanced housing coupled to said mast.

The system may comprise a data recorder, and optionally a clock, located within the central hub, the data recorder being electrically coupled to each of the sensors in order to receive seismic data therefrom. Alternatively, the system may comprise a data recorder, and optionally a clock, co-located with each seismic sensor.

The sensor system according may comprise at least one electromagnetic sensor. Each electromagnetic sensor may comprise one or more electrodes located in a peripheral end region of each of said arms.

According to a third aspect of the present invention there is provided a sensor system for deployment on or close to the seabed in marine seismic surveys. The system comprises a substantially rigid and planar frame, and a plurality of seismic sensors mounted to the frame at respective peripheral locations. Optionally, a further sensor may be mounted at a central location.

The frame may be substantially triangular or quadratic and a seismic sensor is mounted at or close to each of the points of the triangular or quadratic frame. Each seismic sensor may be mounted to the frame by means of a substantially flexible coupling mechanism. The coupling mechanism may comprise one or more wires, ropes, or elastic bands.

According to a fourth aspect of the present invention there is provided a marine seismic survey system comprising one or more ropes, a rope deployment system for deploying the or each rope on or close to the seabed, and a multiplicity of sensor systems according to the above third aspect of the invention. The marine seismic survey system further comprises an attachment mechanism for attaching and detaching the sensor systems to the rope(s) during deployment.

According to a fifth aspect of the present invention there is provided an apparatus for collecting sensor nodes used in a marine seismic survey, where the nodes are configured to ascend towards the sea surface following use in a seismic survey, the apparatus comprising a funnel for deployment in the water and being configured to receive and capture ascending sensor nodes.

The apparatus may comprise a detector for detecting location related signals emitted by sensor nodes and a transmitter for sending received location related signals to a vessel positioning system of a vessel on which the apparatus is located.

The apparatus may comprise a node deployment mechanism configured to deploy nodes into the water through said funnel.

According to a sixth aspect of the present invention there is provided a vessel comprising the apparatus of the above fifth aspect of the invention.

According to a seventh aspect of the present invention there is provided method of collecting sensor nodes used in a marine seismic survey. The method comprises causing a sensor node to ascend through the water towards the surface, causing the sensor node to enter a collection system deployed on or close to the sea surface, via a funnel submerged in the water, capturing the sensor node within the collection system, and moving the captured sensor node to a storage location.

The step of causing the sensor node to enter a collection system may comprise estimating a surface arrival location for the ascending sensor node, and causing said funnel to move to approximately said surface arrival location.

Where the collection system is located on or within a vessel, the step of causing said funnel to move to approximately said surface arrival location comprising maneuvering the vessel to put the funnel approximately at said surface arrival location.

The step of estimating a surface arrival location for the ascending sensor node may comprise receiving a wireless signal, for example an acoustic signal, transmitted by the sensor node and processing that signal to estimate the surface arrival location.

DETAILED DESCRIPTION

It will be appreciated from the discussion presented above that the use of Ocean Bottom Nodes (OBNs) operating as receivers in marine seismic surveys is very desirable as it allows both S and P wave data to be collected with relatively high signal-to-noise rations. The receivers should be able to operate in both shallow and deep water (>2000 m). The survey areas can be large and may involve shuffle/roll of receivers along the seabed as shooting progresses. Large numbers of receivers (on the order of several thousand) may be deployed in a large survey campaign.

The node spacing of a 3D seabed seismic survey for deeper targets is typically 200-400 m, denser for shallower targets. It should be possible to land receivers on the seabed to an accuracy within 10%-20% of the receiver separation distance. Receivers may be provided with onboard positioning systems to ensure that the node spacing (landing position) is within the tolerances. The actual seabed position of the receivers can be calculated from the seismic shots performed during the survey. The heading, that is orientation, of the nodes can be arbitrary, as long as the orientation can be determined from the shots (or using other instruments). [When using nodes on wire or rope, the inline spacing between the nodes typically is 25 m to 50 m. The spacing between lines may be 150-300 meters.]

Embodiment 1

Figure 2A:
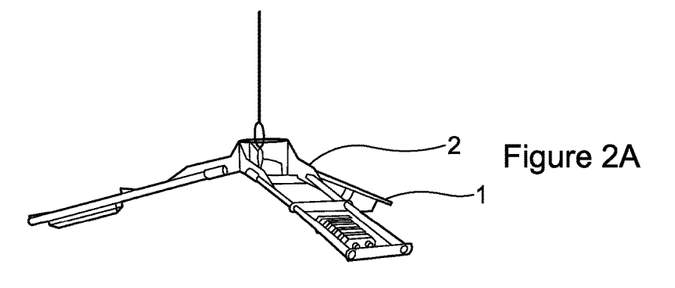
FIGS. 2A and 2B illustrate a tripod OBN system in a deploying and deploying configuration.
Figure 2B:
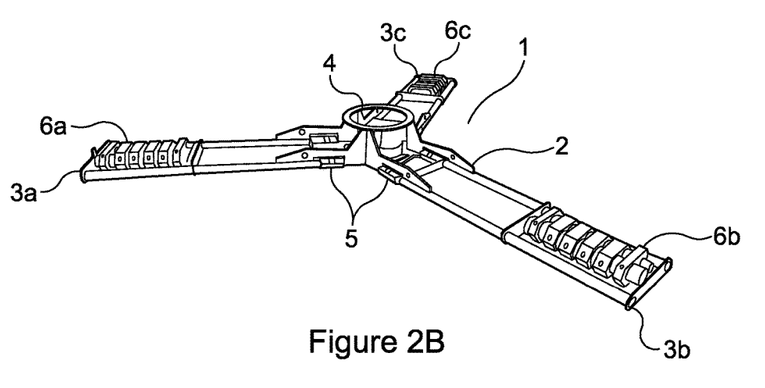

FIGS. 2A and 2B illustrate schematically an Ocean Bottom Node (OBN) receiver system 1. More particularly, FIG. 2A illustrates the system as it is in the process of being lowered into the water, e.g. from a survey vessel, whilst FIG. 2B illustrates the system once it has been lowered to, and settled onto, the seabed.

The system comprises a frame 2 having three arms 3a-c attached to a central support hub 4. The arms are attached to the hub by respective hinges 5 that allow the arms to pivot relative to the hub to some limited extent, e.g. zero to −30 degrees relative to the horizontal. The arms are equally spaced around the central hub, i.e. spaced by 120 degrees.

Figure 2C:
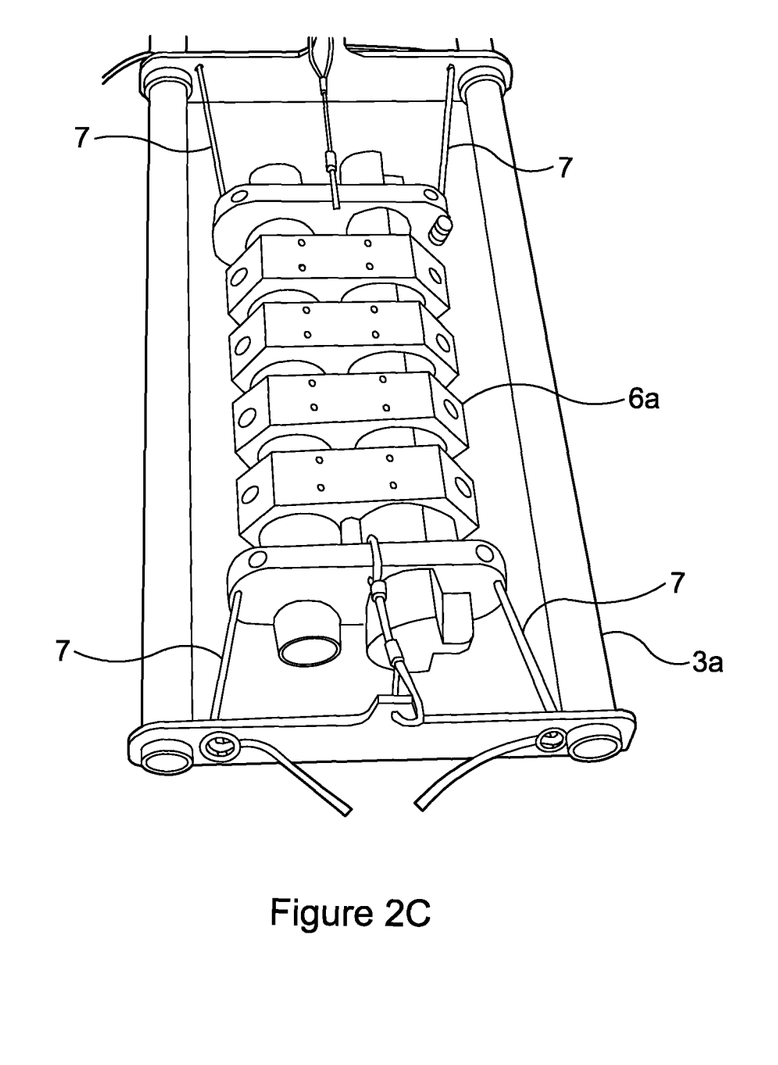
FIG. 2C show a detail of the OBN system of FIGS. 2A and 2B, showing in particular a sensor.

At the end of each arm 3a-c there is provided a 4c sensor 6a-c that may have a known construction and mode of operation. For example, the sensors may be Geospace Ocean Bottom Recorders (OBX™) incorporating a hydrophone and three orthogonally oriented geophones. As shown in FIG. 2C, which shows a detail of the system 1, the sensors 6a-c are attached within respective arms by wires or ropes or elastic bands 7 that are provided with a small degree of slack, but which are otherwise tight enough to retain the sensors centralized within the arms, avoiding direct contact between the arms and the sensors. This allows the sensors to settle into contact with the seabed once the sensor system is fully deployed, whilst of course retaining the sensors within the frame during the deployment procedure. This contact with the seabed is important as it allows data associated with both P and S waves to be collected by the sensor system. The sensors may incorporate clocks and/or data recorders.

This mechanical system decouples the sensors from the frame structure, due to the slack on the wires (or ropes or elastic bands), once it has landed on the seabed, limiting potential crosstalk between the individual nodes via the frame and/or avoiding picking up noise from the motion of the frame itself. It will also be noted that the hinged attachment (soft joints) of the arms to the central support structure—providing a tripod like structure—further assists in reducing potential motion (e.g. resonances induced in the frame from sea currents or due to instability on a rough seabed) via the arms, and ensures appropriate contact between the sensors and the seabed particularly where the seabed is uneven or rocks or other projections are present.

It will be appreciated that the system of FIG. 2, comprising as it does three regularly spaced 4c sensors, is able to measure pressure and vertical particle velocity in three orthogonal directions (x, y and z), at three known locations. This in turn allows the calculation of the horizontal spatial derivatives of the pressure and particle velocity including the 6c components to be derived, and in particular the gradients dp/dx, dp/dy and dVz/dx,dVz/dy.

A central portion of the system may be a void as shown in the Figures. However, a further sensor, such as a 4C unit, may be added at the centre of the structure, e.g. within a central the hub. A data recorder and or clock may also be incorporated into this hub.

The system may be configured to allow the second order horizontal spatial derivatives of the pressure and particle velocity to be calculated, to improve value even more (allowing even better interpolation and quality improvement in data processing and imaging).

Embodiment 2

Figure 3:
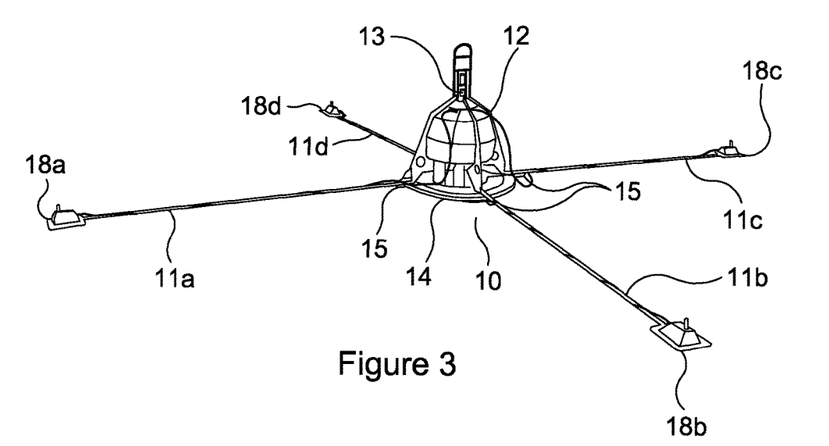
FIG. 3 shows an alternative OBN system in a deployed state.

FIG. 3 illustrates schematically an alternative Ocean Bottom Node (OBN) receiver system. This system 10 comprises four foldable sensor arms 11a-d that in situ are stretched out on the seafloor and connected to a buoyant central recording hub 12 with an internal acoustic release system 13 and anchor plate 14. The arms are pivotally attached to the recording hub 12 via respective hinges 15.

Figure 4A:
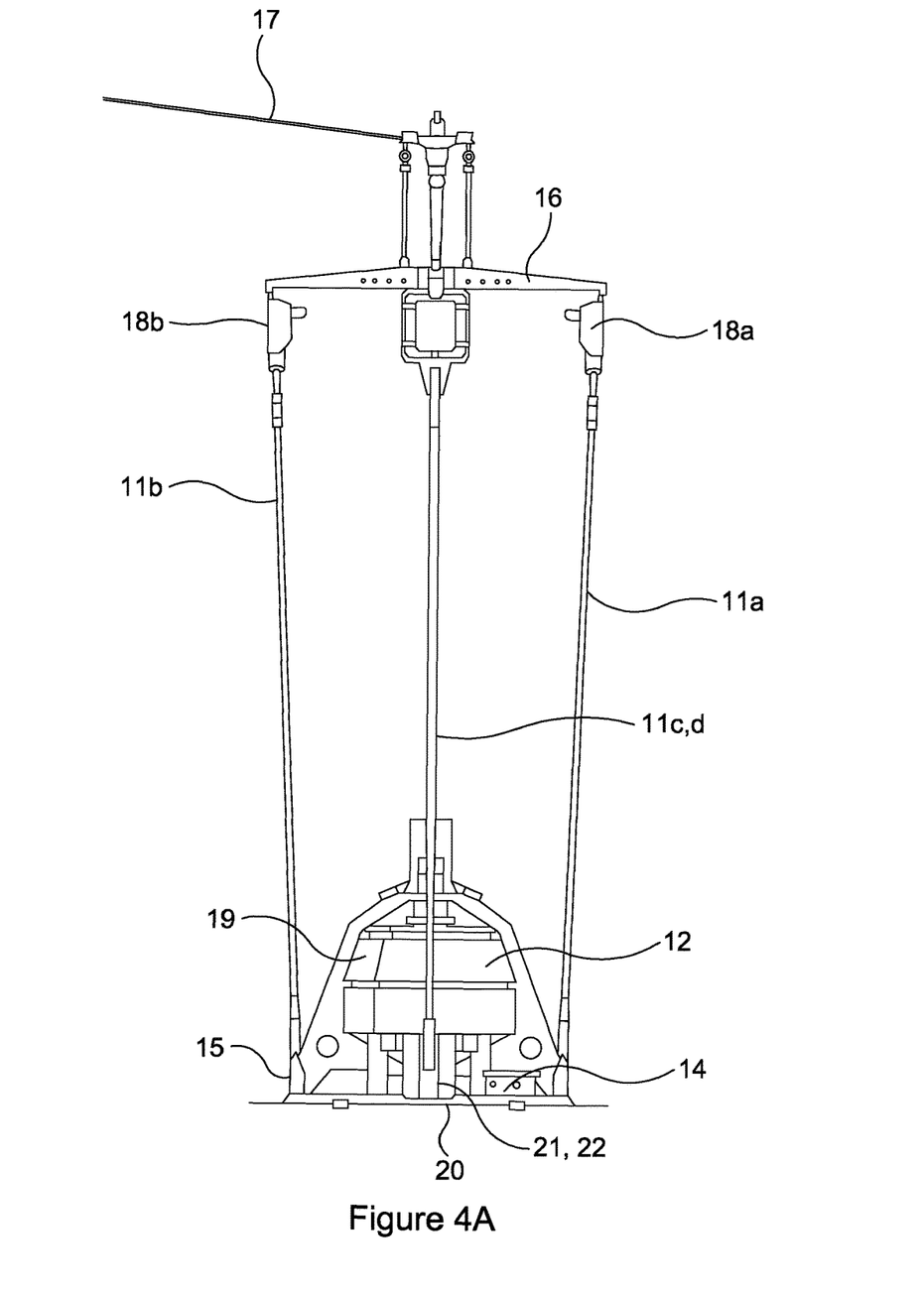
FIG. 4A shows the OBN system of FIG. 3 in an undeployed state.

Whilst FIG. 3 illustrates the OBN receiver system in a deployed state, FIG. 4A illustrates the system in a pre-deployment state in which the arms 11a-d are folded to a near vertical position for engagement at their upper ends with a deployment tool 16.

Figure 4B:
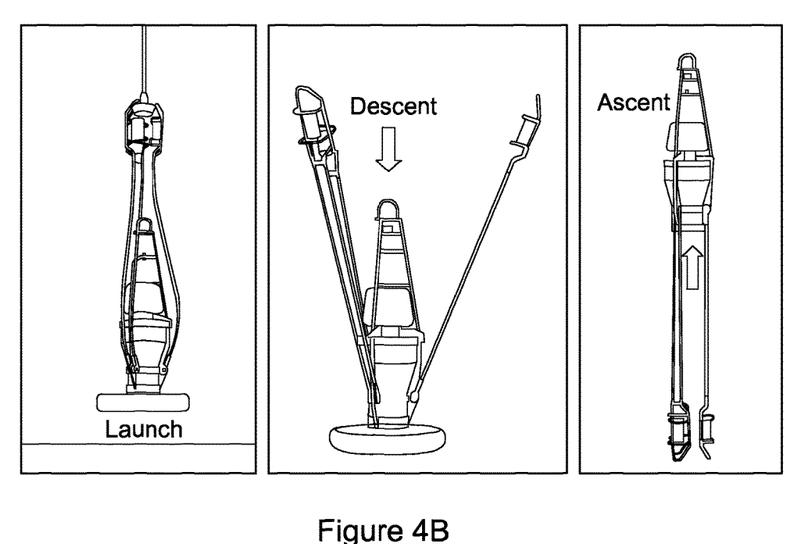
FIG. 4B shows various deployment steps for the OBN system of FIGS. 3 and 4A.

The sensor system 10 may be lowered to the seabed, or to a position close to the seabed, and a trigger rope 17 (see FIG. 4) may be used to release the unit allowing it to fall through the water and land on the seabed with its arm unfolded. Typically the release system will incorporate a hydro-acoustic transponder to give the position of the unit before it is released. When less accurate target drop positions are allowed, the system may be dropped from a position higher up in the water column, or even from air into the water. The system is made such that the drag of the arms and the speed of the decent through the water causes the arms to remain folded in an upright position during the decent, with the arms subsequently unfolding automatically due to their own weight when the central hub hits the seabed and motion stops. This deployment process is illustrated in FIG. 4B. A 2c sensor 18a-d is located at the end of each arm, the sensor comprising a hydrophone and a vertical geophone. In addition, a further 2c sensor 18f is located in the recording hub 12, with all sensors being mechanically coupled to the seabed. Instead of 2c sensors, all or some of the five sensor units may be 4c sensors (each comprising a pressure sensor and three orthogonal geophones or accelerometers).

In order to facilitate release of the system 10 from the seabed after completion of a survey, the recording hub 12 comprises a buoyant housing 18 to which the foldable arms are attached. The housing 19 is in turn coupled to a "clump weight" or anchor plate 20 that sits beneath the housing. This coupling is via an attachment 21 that includes an acoustically activated release mechanism 22. Following completion of a survey an acoustic release signal can be transmitted to the system 10 (e.g. from a survey mechanism or acoustic source lowered into the water) to cause the buoyant housing 19 and the attached arms etc to be released from the anchor plate 20, allowing the system 10 to float to the surface for subsequent collection. Alternatively, the release system releases a buoy that floats up to the surface with a rope attached to the seabed unit.

The sensor system 10, comprising five regularly spaced 2c sensors (or 4c sensors), again allows the following 6c components to be measured or derived at the seabed: p, dp/dx, dp/dy and V, dVz/dx,dVz/dy.

Embodiment 3

Figure 5:
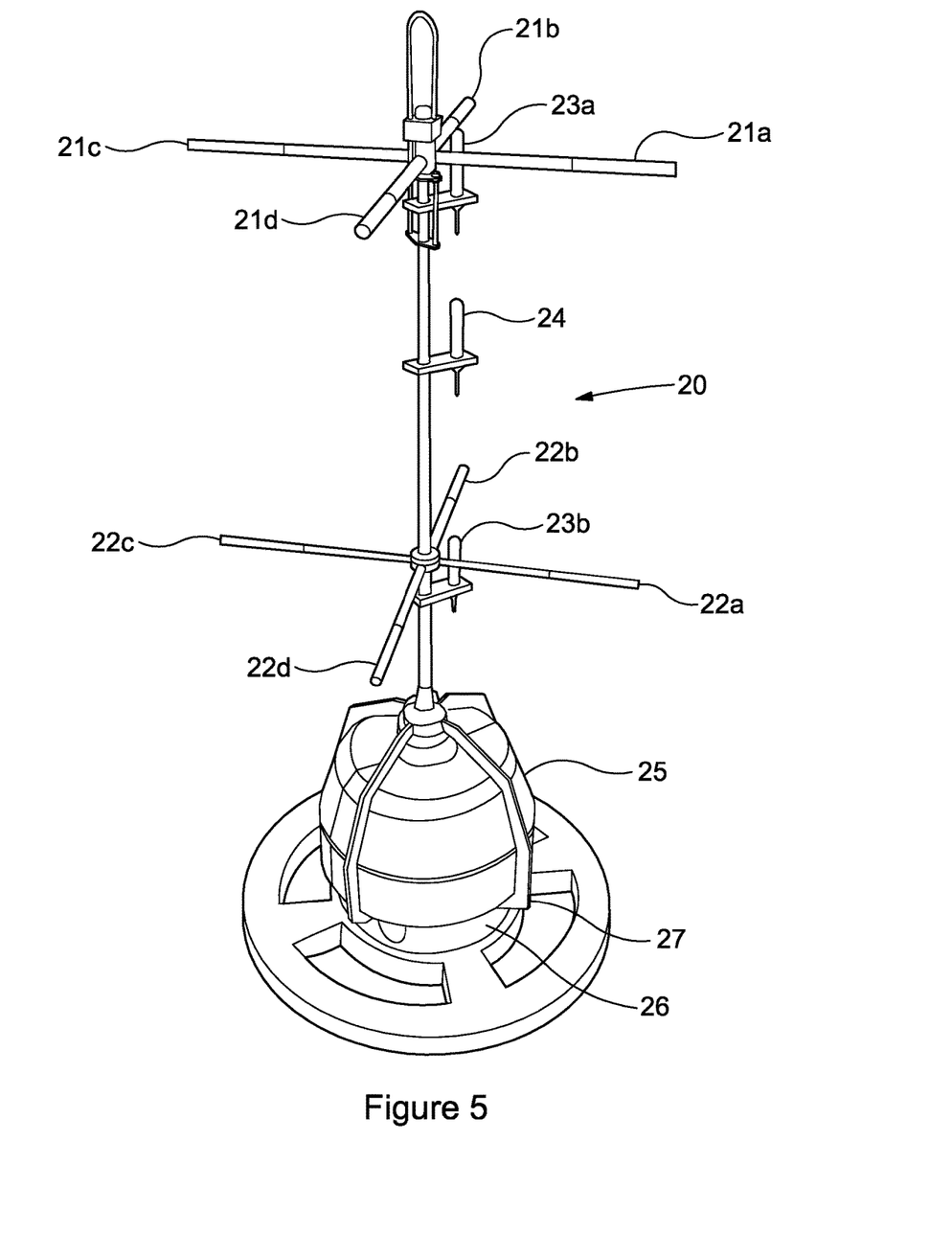
FIG. 5 shows a further alternative OBN system.

FIG. 5 illustrates a 6c OBN sensor system 20 that conforms to the principles of the system illustrated generally in FIG. 1, right hand view. However, rather than having three hydrophones (pressure sensors) at each level (upper and lower), the system comprises five hydrophones at each level, four 21a-d, 22a-d arranged at the ends of respective extension arms, and a single centrally located hydrophone 23a,b. In addition, a further hydrophone 24 is provided at a central location, intermediate the upper and lower hydrophone arrays. The various sensors are attached to a rigid, vertically extending mast (although this mast may be, for example, a rope supported at its upper end by a flotation element).

As with embodiment 2, this third embodiment comprises a central, buoyant hub 25 to which the hydrophone arrays are secured. The central hub 25 is in turn releasably coupled to an anchor plate 26 via an acoustic release mechanism 27. Again, as with embodiment 2, the central hub and attached sensor structure may be floated back to the surface by activating the acoustic release mechanism 27.

Each hydrophone in the array is configured to measure pressure, and each may be configured to record independently of the other hydrophones individually. Alternatively, pairs of hydrophones may be hardwired in selected pairs. The known geometrical distribution (individual distances and relative orientation) of the sensors makes it possible to measure or calculate the first and second order spatial derivatives of pressure, in all three directions (x,y,z). Note that the first derivative of pressure is density times acceleration (or particle velocity, if integrated over time). That is, the recording gives particle acceleration (or particle velocity) and its first order spatial derivative in all directions. As long as the structure of the arms and supports are relatively "soft", as is the intension of the construction, a sensor will be detached from the motion of the seabed ("non-coupled") and the data will represent pressure and particle motion of the water only, unaffected by the presence of the recorder structure itself. The structure itself is designed to minimize interaction between the structure and the pressure and pressure gradients in the water, by selecting rigid but thin and small dimensions for the support, whilst keeping the sensors at sufficient distance from the major acoustic wave reflecting objects of the unit, including the buoyant hub and anchor.

In addition to the hydrophone array, one may add a 4C sensor at the base of the structure, to record shear wave data at the seabed. The combined data set may be used to improve the data quality for both P-waves and S-waves.

Embodiment 4

Figure 6:
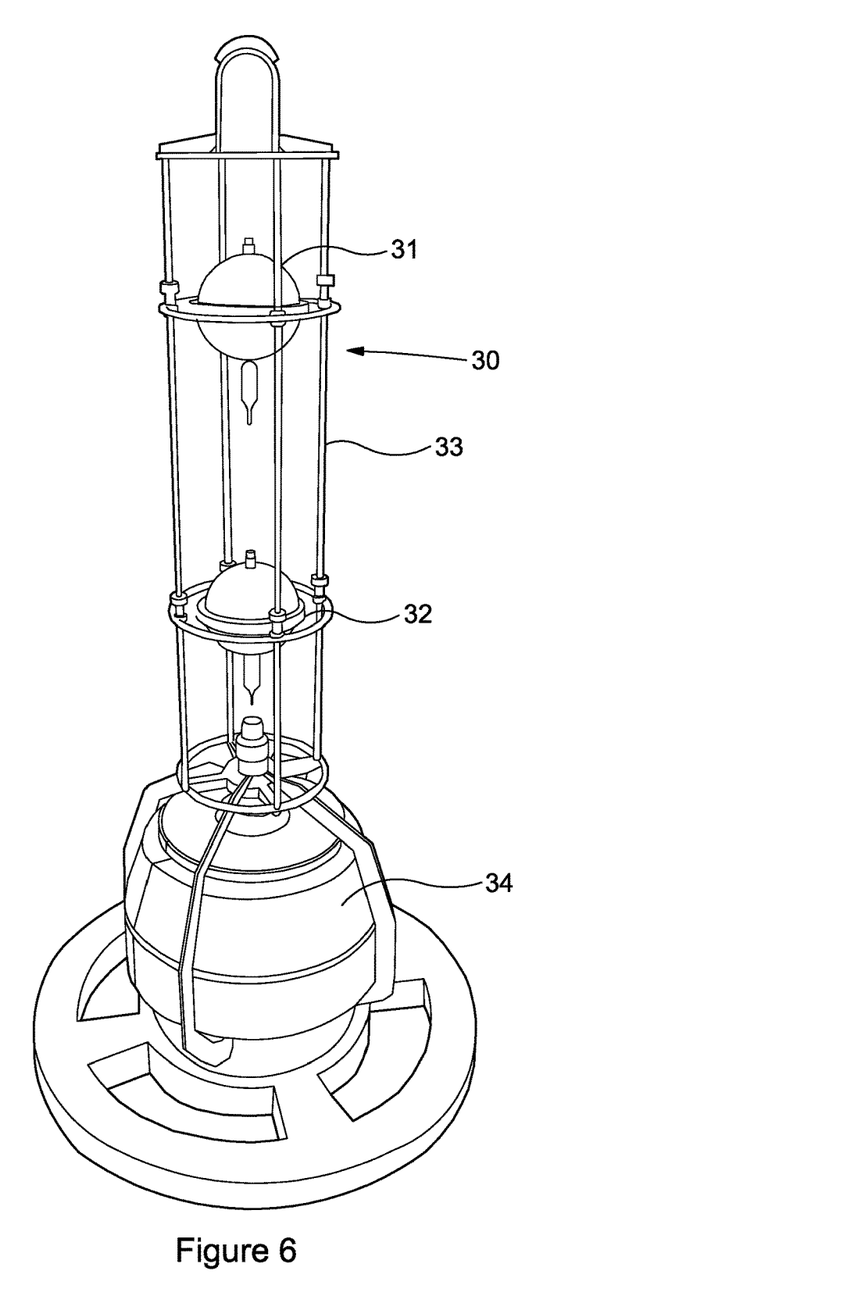
FIG. 6 shows a still further alternative OBN system.

A further sensor configuration 30 is illustrated schematically in FIG. 6. This configuration is similar to that of Embodiment 3, except that the hydrophone arms of embodiment 3 are replaced with two suspended 4C sensors. Each 4C sensor comprises one hydrophone and three orthogonal accelerometers or geophones, e.g. micro electro-mechanical systems (MEMS) accelerometers. These are contained within upper and lower neutrally balanced spheres 31,32 that are suspended within a frame 33, supported by thin ropes or thin elastic rubber band in order to prevent the sensors from floating away from their designated positions and directions whilst allowing them to be acoustically decoupled from the support structure. The central recording hub 34 may contain a single hydrophone and three orthogonally oriented (MEMS) accelerometers, coupled to the seabed to measure shear waves. It may also contain a separate tilt meter to measure the inclination of the structure (if the MEMS system cannot do that by itself).

It will be appreciated that the sensor system of FIG. 5 is able to measure P, Vx, Vy, and Vz within the water, at two vertically spaced apart locations. Hence, it is possible to derive the vertical gradient of the horizontal particle velocity. An analysis of the relevant mathematics shows that the vertical gradient of the horizontal particle velocity is analogous to the horizontal gradient of the vertical particle velocity (using curl V=0).

It is known that interesting information concerning subsea structures can be obtained using electromagnetic (EM) surveys. The information obtained from such surveys may be used to enhance or compliment images obtained using marine seismic surveys. It will be appreciated that EM sensors required to conduct an EM survey may usefully be integrated into sensor systems of the type described above.

Embodiment 5

Figure 7A:
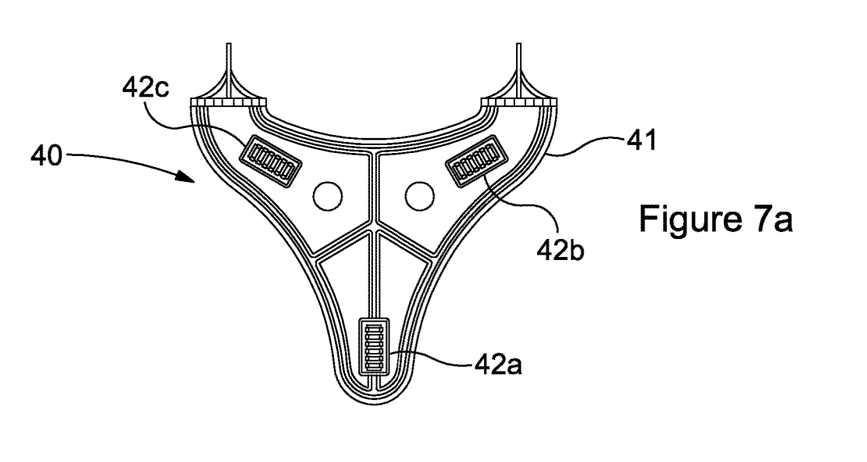
FIG. 7A shows a still further alternative OBN system comprising a triangle support frame.
Figure 7B:
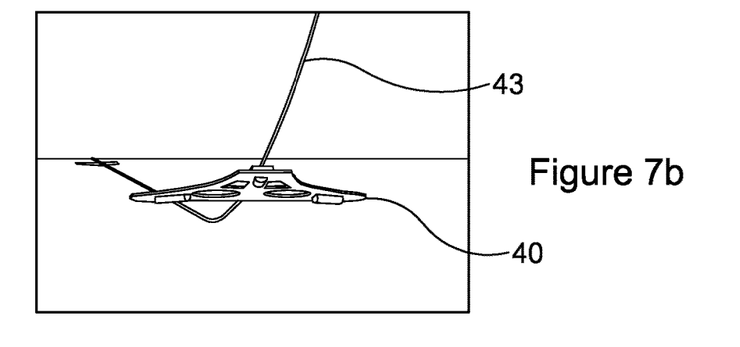
FIGS. 7B and 7C show two alternative node-on-a-rope deployment systems.
Figure 7C:
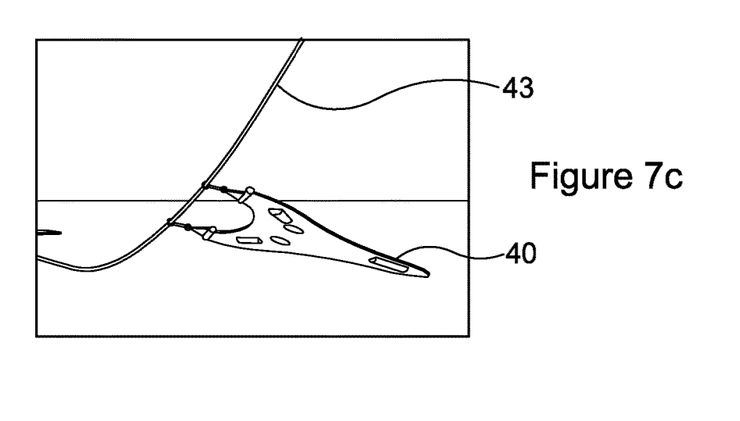
Figure 7D:
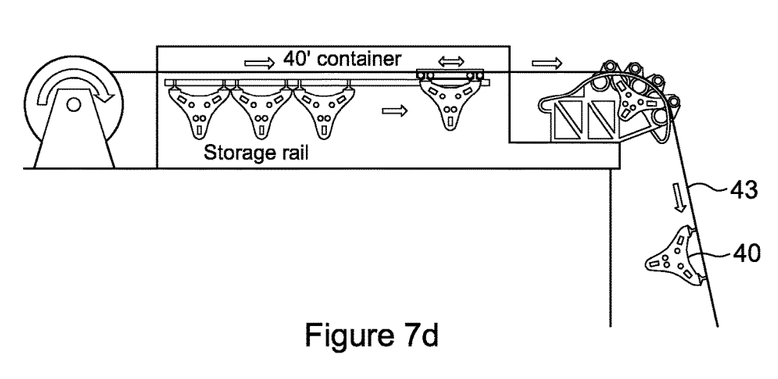
FIG. 7D shows a "ski-lift" deployment system for the OBN system of FIG. 7A.

FIG. 7a illustrates a further sensor system 40 that is suitable for deployment via a rope or wire (a special "triangle nodes on wire" arrangement). The triangle node sensor system comprises a rigid frame 41, with three or more 4c sensors 42a,b,c attached to it using the wire-principle (described above) in order to decouple the nodes from the structure. The Triangle nodes 40 can either be attached to the wire 43 along the centre line or along one side (as a flag line). The best configuration depends on how the nodes are attached and detached from the wire, the behaviour during lay out and recovery, and the seismic de-coupling from the wire during recording. FIGS. 7b to 7d shown different options for deployment of this system:

FIG. 7b—triangle with wire centre line attachment

FIG. 7c—flag line attachment

FIG. 7d-"ski-lift" principle used in a launch and recovery system for the "flag line attachment".

The "flag line" fixture is the preferred configuration as it will allow for simpler attachment to the wire using spring loaded grips (as for ski-lifts); for both alternatives the triangle can rotate around the wire, thus the suspended position of the node will depend on gravity but the drag forces will be control the orientation during deployment. Thus, for the flag line concept, it is virtually impossible for the triangles to penetrate into the seabed. Rather, they will naturally tend to flip to the side. The venting area is also removed in the outer section in order to ensure that this part will be flipped up by the drag when the wire and node is laid down on the seabed. Basin or field testing is however recommended in order to verify and optimize the hydrodynamic behaviour and design.

The nodes are attached to the main laying wire acting as a long "fishing line" for the nodes. The main steel wire has a cross-section to give sufficient on-bottom weight. The wire may possibly be prepared with mating sleeves. The use of spring loaded grips to allow attachment to bare wire may also be possible. In principle only one fixed grip is required; the other corner can have a loose grip ensuring that the node stays parallel to the wire. The nodes are first suspended from a storage rail where an automatic shuttle feeder latches the nodes on and off the wire. Recovery is performed by running the line and machinery in the opposite direction. This arrangement allows for continuous wire installation/recovery without interruption and manual handling.

Similar triangular sensor systems may be configured for deployment by means of an ROV.

OBN Surface Collection System

When using nodes suited for individual deploy and/or recovery from the seabed by release systems and buoyancy aided recovery, a safe and efficient surface deploy and collect system is required. There will now be described such a system that is referred to here as "The Teleporter Launch and Rovery System". This is a system in which nodes are released and hooked up under the sea surface. The nodes may be fed to the Launch And Recovery System (LARS) on conveyor belts, hooked up to the hoisting winch, and dragged into the "Teleporter" chamber (the upper part of the launch and recovery tube).

Figure 8:
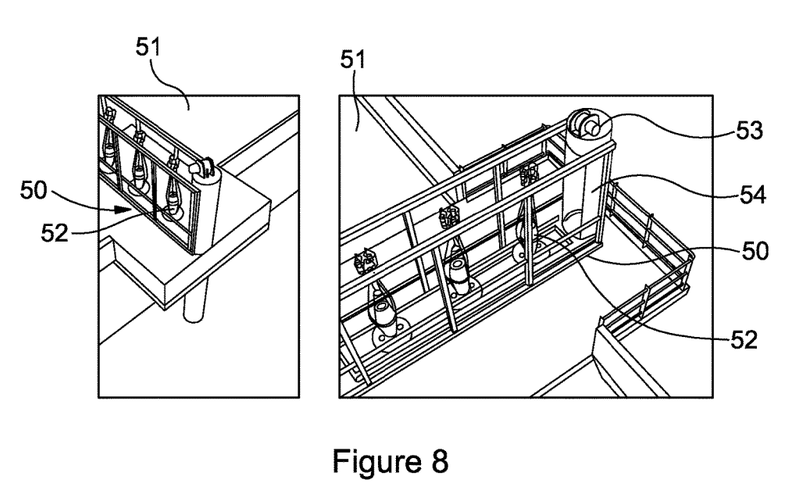
FIGS. 8 and 9 show respectively topside and bottomside views of an OBN deployment system.

FIG. 8 shows two topside views of the Teleporter Launch and Recovery system 50 that will typically be mounted on the deck 51 of a support vessel. A sensor node 52 is hooked up with a special release and docking tool 53 and hoisted down to the submerged end of the launch and recovery tube 54. The tool releases the node by means of topside command (automatic or manual), allowing the sensor node 52 to drop through the water.

Figure 9:
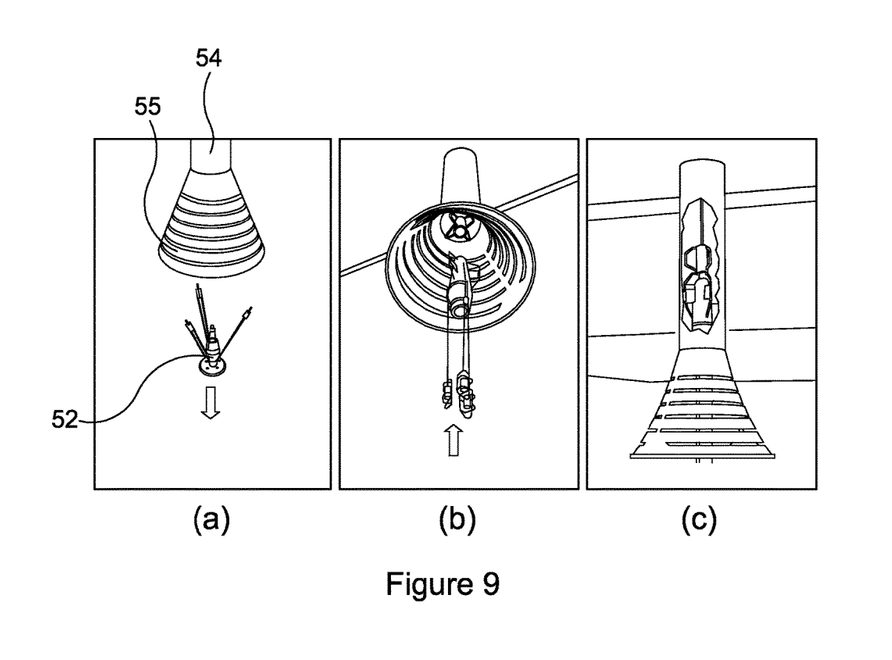

FIG. 9 is a bottomside view of the Teleporter Launch and Recovery system. During recovery a sensor node 52 must enter into a guide funnel 55, (a) and (b), progressing upwards until it stops at docking position below the sea surface (c). The node 52 is centralized inside the launch and recovery tube 54 by means of the protection and guide bars around the rudders. The release and docking tool (also with guide bars for centralization inside the tube) can be in position or hoisted down for docking to the node, which then is hoisted up to the "Teleporter" and deployed on the conveyor belt. The docking and release position is monitored by a subsea camera. If required the hoisting winch or even the complete launch and recovery tube can be heave compensated.

The funnel 55 can be equipped with a special homing device in order to simplify navigation into the funnel. One embodiment would involve a hydro-acoustic navigation transponder on each node, with the dynamic positioning system of the vessel being locked to the node allowing the vessel to be steered to a horizontal directly above the ascending node, ensuring that the node finally "hits" the funnel. To increase efficiency, several nodes may be in transit from the seabed simultaneously, surfacing just with enough delay to allow the vessel to be correctly repositioned between each node.

Continuous launch and recovery operations may require "production line" arrangements on deck, with data download, synchronization, re-programming and checking of the nodes. Two "Teleporters" may be provided on either side of the vessel, one for launch and the other for recovery.

As a backup, facilities for conventional crane pick-up should be available on the vessel in case a node is unable to reach the funnel entry point. Nodes should have surface tracking facilities and flashlights to make them easier to locate on the surface.

Figure 10A:
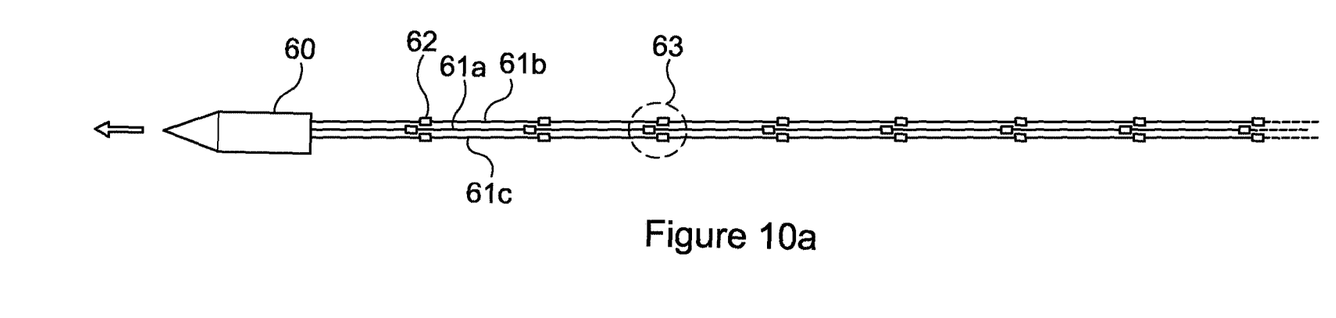
FIGS. 10a and 10b illustrate two procedures for laying ropes and employing a forward moving vessel.
Figure 10B:
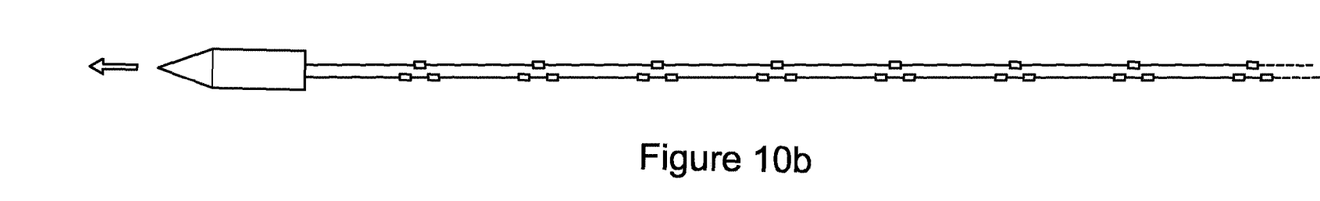

Referring now to FIG. 10a, this illustrates a method of deploying complex sensor systems on the sea bed. According to this method a vessel 60 advances in a conventional manner whilst laying three ropes, 61a to c, in parallel and closely spaced. This spacing might be for example 2 to 15 meters. Each rope supports at regular or semi-intervals sensors 62 such as a 2C or 4C sensor. The sensors are aligned such that, once laid, the sensors form spaced clusters 63 of 2C or 4C sensors, with three sensors in each cluster. Each cluster therefore provides a seabed multicomponent sensor system such as the 6C sensor system described above. Once laid, the exact sensor location, spacing and orientation can be determined from the recorded seismic data itself (using several shots) or by hydro-acoustic systems incorporated on the nodes or seabed cable/rope. In an alternative configuration, a vessel may lay only two parallel ropes, with one rope having double the number of sensors. This is illustrated in FIG. 10b.

This approach to deploying multicomponent sensor systems is one that can be implemented with relative ease relying as it does on existing technologies used for laying single strings of 2C or 4C sensors.

Figure 11:
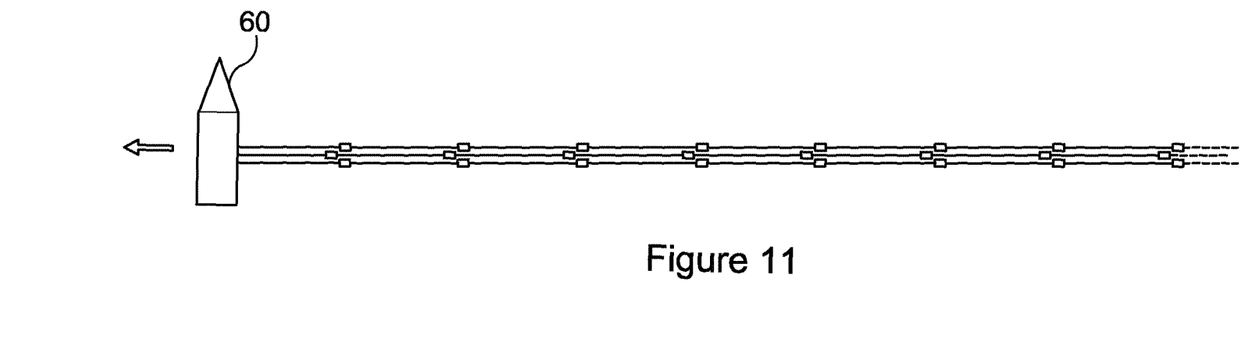
FIG. 11 illustrates an alternative procedure for laying ropes using a sideways advancing vessel.

FIG. 11 illustrates an alternative approach to deploying these sensor systems and which relies upon the laying vessel 60 advancing sideways as the ropes are laid.

It will be appreciated by the person of skill in the art that various modifications may be made to the above described embodiments without departing from the scope of the present invention.

The invention claimed is:

1. A sensor system for deployment on or close to the seabed in marine seismic surveys, comprising:

a central hub;

a plurality of arms coupled to the central hub, wherein each arm has a degree of freedom of movement with respect to the central hub; and a plurality of seismic sensors for measuring pressure and/or motion due to acoustic and/or elastic waves, the seismic sensors being mounted within respective arms by wires or ropes or elastic bands that are provided with a predetermined degree of slack, wherein said wires or ropes or elastic bands allow the seismic sensors to settle into mechanical contact with the seabed when the sensor system is deployed whilst being substantially centralized within a space defined by or within at least one arm of the plurality of arms.

2. The sensor system according to claim 1, wherein each arm is coupled to the central hub so as to allow the arm to pivot relative to the central hub.

3. The sensor system according to claim 2, wherein the arms are pivotal between a near vertical pre-deployment position to a near horizontal deployed position, the sensor system comprising an arm release mechanism for facilitating movement of the arms from the pre-deployment position to the deployed position when the central hub is located on or close to the seabed.

4. The sensor system according to claim 2, wherein said arms are freely pivotable over an angular range sufficient to allow all arms to settle onto the seabed when the central hub is located on or close to the seabed.

5. The sensor system according to claim 1, further comprising:

a data recorder located within the central hub, the data recorder being coupled to each of the sensors in order to receive seismic data therefrom; or a combination of the data recorder and a clock located within the central hub to enable synchronization of data received from the sensors.

6. The sensor system according to claim 1, further comprising:

a data recorder mounted to each of the arms and co-located with the associated seismic sensor; or a combination of the data recorder and a clock mounted to each of the arms and co-located with the associated seismic sensor.

7. The sensor system according to claim 1, further comprising either three or four of said arms.

8. The sensor system according to claim 1, further comprising at least one seismic sensor located within or in close proximity to said central hub.

9. The sensor system according to claim 1, wherein the seismic sensor mounted in each of said arms is one of a single component or multicomponent sensor.

10. The sensor system according to claim 1, wherein the at least one seismic sensor is mounted at a peripheral end region of an arm.

11. The sensor system according to claim 1, further comprising an anchor plate and a release system for releasable securing the central hub to the anchor plate, the release system being operable to release the central hub and attached components from the anchor plate to allow their retrieval.

12. The sensor system according to claim 1, further comprising at least one electromagnetic sensor.

13. The sensor system according to claim 1, further comprising at least one electromagnetic sensor, wherein the or each electromagnetic sensor comprises one or more electrodes located in a peripheral end region of each of said arms.

* * * * *